United States Patent [19]

Fengler et al.

[11] 3,974,558

[45] Aug. 17, 1976

[54] METHOD OF INSTALLING ANNULAR SEAL FOR COAXIAL TUBULAR MEMBER

[76] Inventors: Werner H. Fengler; Richard R. Fengler, both of 23651 Fordson Drive, Dearborn, Mich. 48124

[22] Filed: May 1, 1975

[21] Appl. No.: 573,475

Related U.S. Application Data

[62] Division of Ser. No. 375,737, July 2, 1973, Pat. No. 3,884,483.

[52] U.S. Cl. ................................. 29/451; 29/453; 29/235
[51] Int. Cl.² ........................................ B23P 11/02
[58] Field of Search .................... 29/451, 235, 453; 277/208, 212 F; 16/2

[56] References Cited
UNITED STATES PATENTS

| 1,484,610 | 2/1924 | Myers | 29/453 UX |
| 2,625,415 | 1/1953 | Smith | 29/451 UX |
| 2,687,831 | 8/1954 | Miller | 29/453 X |
| 2,889,964 | 6/1959 | Cooprider | 29/453 UX |
| 3,413,021 | 11/1968 | Potts | 29/453 UX |

Primary Examiner—Charlie T. Moon
Attorney, Agent, or Firm—Willis Bugbee

[57] ABSTRACT

This upstroke-cushioning expansible strut consists of a spring-pressed hollow upper inner arm having on its lower end a piston head reciprocable within a roughly cylindrical hollow lower outer arm, the former being pivoted to an automobile rear hatch while the latter is pivoted to the lower part of the automobile body. Mounted between the lower arm and the upper arm is an elongated hollow spool-shaped internal seal which also guides the upper arm as it is propelled upward by the lifting force applied by the operator, assisted by internal springs. The air is allowed to escape gradually through bleed orifices until the upper arm nears its fully extended position, whereupon the release of the air is halted by the covering up of the orifices by the internal seal when said orifices reach said seal, thereby cushioning the impact which would otherwise occur between the piston head on the lower end of the upper inner arm and the upper end of the lower outer arm. The internal seal also acts as a resilient stop.

1 Claim, 5 Drawing Figures

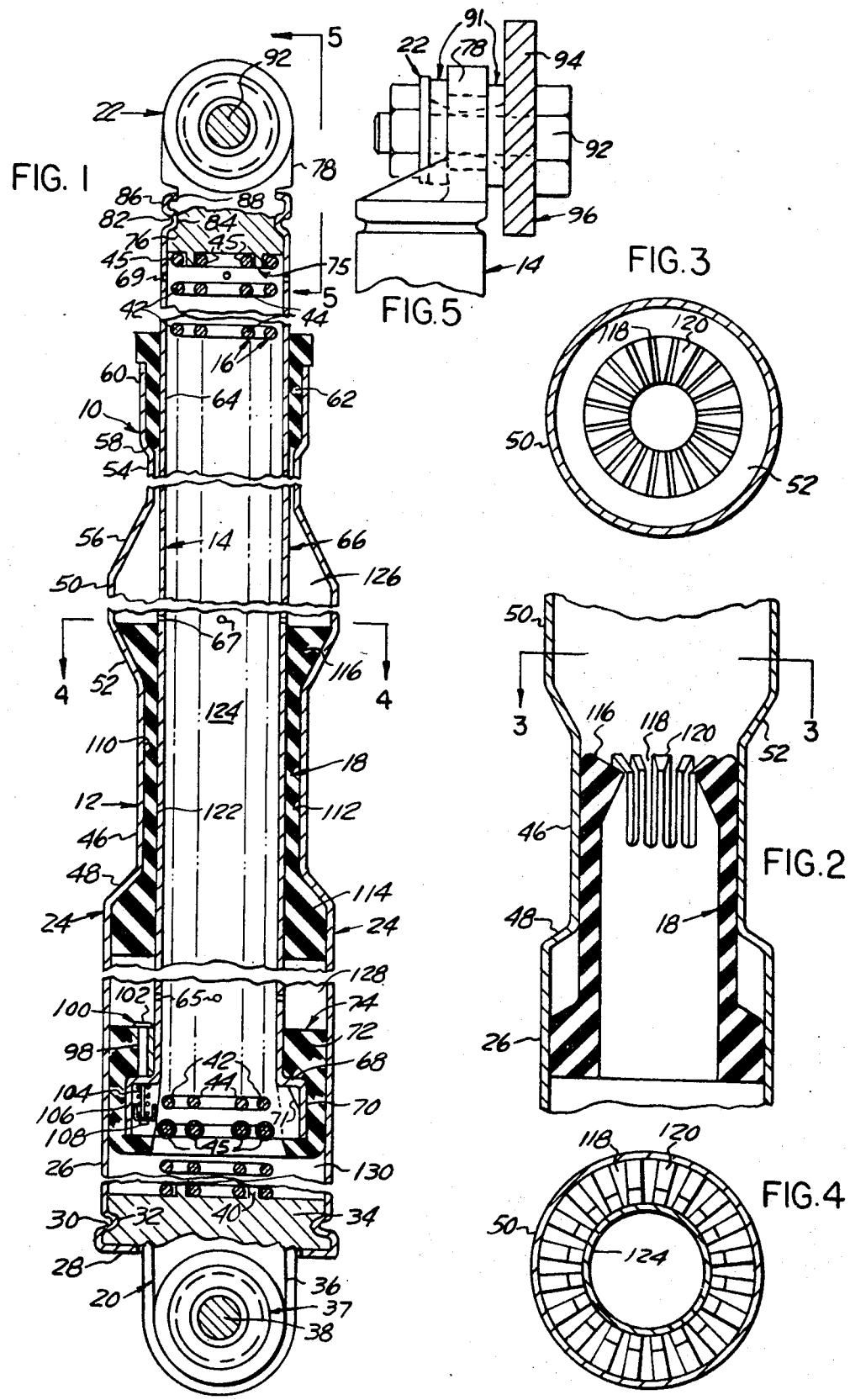

METHOD OF INSTALLING ANNULAR SEAL FOR COAXIAL TUBULAR MEMBER

This is a division of our co-pending application, Ser. No. 375,737, filed July 2, 1973, for Annular Seal for Coaxial Tubular Members, now U.S. Pat. No. 3,884,483.

BACKGROUND OF THE INVENTION

Certain recent models of automobile bodies at their rearward ends have been equipped with hatches pivoted at their upper ends to the roofs of the bodies and provided on their opposite sides with spring-pressed expansible struts for holding the hatch open while in its raised position during loading or unloading of the automobile body. With small automobile bodies having light-weight hatches, this construction was successful, but when it was applied to larger automobile godies with correspondingly heavier hatches, the heavier springs required to counterbalance the heavier weights caused a violent shock by the impact of the lower end of the upper strut arm at the end of its stroke against the upper end of the lower strut arm. This in turn caused damage to the car body and breakage of the strut.

SUMMARY OF THE INVENTION

The present expansible strut prevents this metal-to-metal clashing of the upper and lower strut arms, as the upper arm nears the end of its upward stroke, by providing cushioning means for the final part of the stroke of the upper strut as its lower end nears its engagement with the upper end of the lower strut. This prevents the hatch hinge breakage which previously has frequently occurred in prior hatch constructions when the hatch is thrown upward and halts abruptly under the excessive force of the powerful counterbalancing springs, especially in large heavy hatches for correspondingly large vehicles. The spool-shaped internal seal between the outer and inner arms also serves as a resilient stop and likewise provides additional guidance for the greatly elongated telescoping arms at locations intermediate their opposite ends.

In the drawings,

FIG. 1 is a central vertical longitudinal section through an upstroke-cushioning expansible strut, with the upper inner tubular arm withdrawn into the lower outer tubular arm in the almost fully expanded position of the strut;

FIG. 2 is a fragmentary longitudinal section similar to FIG. 1 but showing the first stage in the insertion of the hollow spool-shaped internal seal between the inner and outer arms;

FIG. 3 is a cross-section along the line 3—3 of FIG. 2, showing the compression of the upper or forward end of the internal seal while it is being inserted during assembly;

FIG. 4 is a cross-section along the line 4—4 in FIG. 1, showing the expanded upper end of the internal seal after insertion; and FIG. 5 is a fragmentary side elevation of the pivoting upper end of the strut looking in the direction of the arrows 5—5 in FIG. 1.

Referring to the drawing in detail, FIGS. 1 and 5 show an upstroke-cushioning expansible strut, generally designated 10, according to one form of the invention as consisting generally of a tubular lower outer strut arm 12 and a tubular upper inner strut arm 14 reciprocable as a piston within the outer arm 12 as a cylinder and containing a weight-assisting or counterbalancing spring unit 16. The two tubular arms 12 and 14 are slidable relatively to one another in telescoping relationship but are sealed relatively to one another by a special spool-shaped elastomeric internal intermediate seal 18 which also acts as a resilient stop and likewise provides additional guidance for the greatly elongated telescoping arms at locations intermediate their opposite ends. The lower and upper arms 12 and 14 are connected to a lower part of the car body and rear hatch by lower and upper pivotal connection heads 20 and 22 respectively.

The lower outer arm 12 includes a tubular outer wall, generally designated 24, consisting of a lower cylindrical portion 26 having an annular end wall 28 surrounding the lower pivotal connection 20 and crimped annularly at 30 to an annular groove 32 in the lower head 34 of the lower pivotal connection 20. The latter is preferably a steel or an aluminum casting with its upper surface acting as a spring abutment for the outer lower strut arm 12 against which the assist spring unit 16 exerts its force. Integral with and extending downward from the lower head 34 is a lug 36 which in turn is bored at right angles to the longitudinal axis of the outer arm 12 to receive a pivot bolt 38. The pivot bolt 38 is similar to that of the upper pivotal connection 22 shown in FIG. 5 and described in detail below, and is secured to a lower part of the car body (not shown). The lower head 34 is provided on its upper surface with an upstanding annular rib 40 which spaces the lower ends of the individual outer and inner assist springs 42 and 44 respectively of the spring unit 16. A resilient bushing 37 is assembled between the lug 36 of the lower strut arm 12 and the pivot bolt 38, allowing a resilient swiveling action, should the upper and lower pivot bolts not lie in the same plane. This bushing 37 is preferably of a high-impact plastic, such as a polyamide plastic containing chips of polytetrafluoroethylene plastic. The material for the chips is sold commercially under the trade name "Teflon".

The upper end of the lower cylindrical portion 26 of the outer wall 24 is joined to a constricted intermediate cylindrical portion 46 (FIG. 1) by a convergent frusto-conical portion 48 integral therewith, whereas the upper end of the constricted cylindrical intermediate portion 46 is joined to an intermediate cylindrical portion 50 by an upwardly-diverging frusto-conical portion 52. The intermediate cylindrical portion 50 of the side wall 24 is joined at its upper end to a reduced diameter upper cylindrical portion 54 by a frusto-conical convergent portion 56. The upper cylindrical portion 54 in turn is joined by an upwardly flaring annular portion 58 to a cylindrical upper end portion 60. A flanged hollow cylindrical upper end external sealing and guiding bushing 62 closes the space between the cylindrical upper end portion 60 and the elongated cylindrical portion 64 of the tubular wall or piston rod 66 of the inner arm 14. The tubular wall 66 is provided with axially-spaced lower, intermediate and upper sets of coaxial circumferentially-spaced air bleed orifices 65, 67 and 69, respectively.

The lower end of the tubular wall or piston rod 66 is provided with a radial flange portion 68 which joins the elongated cylindrical wall 64 to a short lower cylindrical end wall portion 70 (FIG. 1). This construction is strengthened by a plurality of circumferentially-spaced ribs 71, one of which is shown at the bottom of FIG. 1.

Surrounding the lower end of the tubular wall 66 is an elastomeric annular lower seal 72 which with the portions 68 and 70 forms a resilient piston head, generally designated 74, on the lower end of the tubular wall 66. The latter has a tapered, upwardly-convergent lower end opening aligned with a correspondingly-tapered mouth 77 in the end wall 79 of the resilient piston head 74. The upper end of the tubular wall or piston rod 66 is closed by the upper head 76 of the upper pivotal connection 22, which includes an offset pivot lug 78 integral with the upper head 76 and extending upward therefrom. The upper head 76 is preferably a steel or an aluminum casting, with its lower surface acting as a spring abutment for the upper inner strut arm 14 against which the assist and counterbalancing spring unit 16 exerts its force. The upper head 76 is joined to the upper end of the tubular wall or piston rod 66 by an annular crimped portion 82 extending into a lower annular groove 84. The tubular wall or piston rod 66 at its upper end terminates in an annular end portion 86 extending into an annular groove 88. The upper head 76, similarly to the lower head 34, is provided with a downwardly-projecting annular rib 75 which spaces the upper ends of the individual outer and inner assist springs 42 and 44 of the spring unit 16. These springs are preferably provided with a coating 45 of elastomeric material in order to prevent any ratchet-like noise while being expanded or contracted.

The offset pivot lug 78 is bored transversely for the reception of an upper pivot bolt 92 which is similar to the lower pivot bolt 36, and which passes through a side portion 94 of the vehicle body hatch, generally designated 96. A resilient bushing 91 is assembled between the lug 78 of the upper strut arm 14 and the pivot bolt 92, allowing a resilient swiveling action as described for the lower strut arm 12. This bushing is preferably of a high-impact plastic, such as a polyamide plastic containing chips of polytetrafluoroethylene plastic, sold commercially under the trade name Teflon.

The portion 68 of the piston head 74 and the adjacent annular seal 72 are drilled parallel to the axis of the inner arm 14 to receive the tubular valve casing 98 (FIG. 1) of a relief valve, generally designated 100, the head 102 of which covers the upper end of the tubular casing 98 while the stem 104 is urged downward by a helical compression spring 106 acting against the enlargement 108 on the lower end of the valve stem 104. This elastomeric annular lower seal 72 is preferably of a highimpact plastic, such as polyamide plastic containing chips of polytetrafluoroethylene plastic, sold commercially under the trade name Teflon.

The constricted intermediate cylindrical portion 46, the frusto-conical portions 48 and 52 adjacent thereto, and the upper part of the lower cylindrical portion 26 (FIG. 1), together with the tubular wall of piston rod 64, enclose a spool-shaped space 110 which, upon assembly of the component parts of the strut 10, is occupied by the spool-shaped hollow elastomeric internal intermediate seal 18. The seal 18, as shown in FIGS. 1 to 4 inclusive, consists of a central hollow cylindrical neck portion 112 with a solid annular lower enlargement 114 on its lower end and a radially slotted annular upper enlargement 116 on its upper end. As the internal seal 18 is made of elastomeric material, such as natural or synthetic rubber or of a polyamide plastic containing chips of polytetrafluoroethylene plastic, sold commercially under the trade name Teflon, the enlargements 114 and 116 are resilient and the slots 118 in the upper head 116 provide compressibility thereof to facilitate the insertion of the internal seal 18 into the spool-shaped chamber 110, in the manner described below.

Prior to the closing of the lower end thereof by the crimpng 30 and by the insertion of the lower pivotal connection 20, the internal seal 18 is inserted within the hollow outer arm 12 by following the procedure shown in FIG. 2. In so doing, the workman assembling the strut 10 pushes the slotted head 116 of the internal seal 18 into the lower cylindrical portion 26 (FIG. 2), whereupon, in passing from the cylindrical portion 26 through the convergent portion 48, its lobes 120 between its slots 118 yield radially inward, as shown in the upper portion of FIG. 2 and in FIG. 3. The assembler continues to push the internal seal 18 inward until the slotted upper enlargement 116 thereof passes upward out beyond the constricted cylindrical portion 46 into the upwardly-diverging portion 52, whereupon the lobes 120 between the radial slots 118 in the upper enlargement 116 expand outward by reason of the resilient elastomeric material thereof. This causes the radial slots 118 between the lobes 120 to widen (FIG. 4). The internal seal 18 comes to rest with the lower enlargement 114 abutting against the convergent wall portion 48 and with the upper enlargement 116 occupying the space within the upwardly-flared portion 52. After inserting the upper portion of the upper arm 14, which is being guided by a bullet-nose portion (not shown) and which during assembly will be discarded, and replaced with the upper head 76, the flared upper enlargement 116 is prevented from collapsing, thereby holding the internal seal 18 securely in place between the flared portions 48 and 52 of the lower arm 12.

In the operation of the upstroke-cushioning expansible strut 10, let it be assumed that the pivotal connections 20 and 22 have been joined to the lower part of the car body (not shown) and to the hatch 96 by their respective pivot bolts 38 and 92, and that the hatch is in its closed position extending downward from its hinges which connect it to the car body roof. To raise the hatch and open the hatchway at the rearward end of the car body, the user grasps the handle (not shown) on the lower end of the hatch and swings it upward and rearward. During this initial stage of the operation, the weight of the hatch is counterbalanced by the springs 42 and 44. As the hatch is raised, however, and the struts 10, of which there are two located one each on opposite sides of the hatch, assume a more nearly perpendicular position relatively to the hatch, the hitherto compressed springs 42 and 44 are able to apply their maximum force as they expand. The upwardly accelerating speed of the hatch during the upper part of its opening procedure, increased by the lifting force imparted to it by the operator, however, is now retarded by the air imprisoned in the cushioning chamber 128 constituting the space between the lower head 114 of the internal seal 18 and the piston head 74. The lower air bleeds through the lowermost orifices 65 until these pass into the central bore 122 in the internal seal 18 and are thereby temporarily closed by said seal 18. Thus, the violent metal-to-metal clashing which previously occurred in prior expansible struts, when applied to heavy hatches, is effectively prevented by the present invention. The air within the central chamber 124 of the inner arm 14 can pass into and out of the upper space 126 bounded by the intermediate cylindrical portion 50 and frusto-conical portion 56 of the outer side wall 24 through the upper air bleed orifices 67 and 69, which are arranged as required by the force exerted and according to the rate of the springs.

To close the hatch, the operator reverses the above-described procedure. Grasping the handle on the now-raised hatch, he pulls downward upon it, thereby causing the tubular upper inner arm 14 to telescope with the tubular lower outer arm 12 as the former passes downward into the latter. The air entrapped in the lower chamber 130 adjacent the base 34 of the lower pivotal connection 20 escapes into the intermediate cushioning chamber 128 and thence through the air bleed orifices 65 into the inner chamber 124 of the inner arm 14 by the opening of the relief valve 100. At the same time, the helical compression springs 42 and 44 are compressed, thereby storing up energy for assisting in the next opening of the hatch.

We claim:

1. A method of installing a resilient tubular elastomeric spool-shaped seal between an inner tubular cylindrical member and a spool-shaped constriction in an outer tubular member spaced radially outward from said inner tubular member, said method comprising
   a. forming in and around one of the annular opposite end enlargements of said resilient tubular elastomeric spool-shaped seal a multiplicity of circumferentially-spaced longitudinally-extending radial slots,
   b. pushing the thus-slotted end enlargement into the correspondingly-tapered entrance to said constriction while causing said entrance to force the portions of the slotted end enlargement between said slots to yield radially inward,
   c. continuing to push the seal into said constriction until the slotted end enlargement passes out of said constriction and the other end enlargement engages as a stop the portion of said outer tubular member immediately preceding the constriction,
   d. causing the portions of the slotted enlargement between said slots to spring outward beyond said constriction, and
   e. inserting a cylindrical tubular member into said tubular seal.

* * * * *